United States Patent
Hoshino

(10) Patent No.: US 10,025,297 B2
(45) Date of Patent: Jul. 17, 2018

(54) MACHINE TOOL AND PARAMETER ADJUSTMENT METHOD THEREFOR

(71) Applicant: NAKAMURA-TOME PRECISION INDUSTRY CO., LTD., Hakusan, Ishikawa (JP)

(72) Inventor: Yoshiharu Hoshino, Kanazawa (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 0 days.

(21) Appl. No.: 15/804,242

(22) Filed: Nov. 6, 2017

(65) Prior Publication Data
US 2018/0129190 A1 May 10, 2018

(30) Foreign Application Priority Data
Nov. 10, 2016 (JP) ................................. 2016-219696

(51) Int. Cl.
G05B 19/18 (2006.01)
G05B 19/416 (2006.01)
H02P 29/40 (2016.01)

(52) U.S. Cl.
CPC .......... G05B 19/4166 (2013.01); H02P 29/40 (2016.02); G05B 2219/41381 (2013.01); H02P 2205/05 (2013.01)

(58) Field of Classification Search
CPC .......... G05B 2219/2616; G05B 19/402; G05B 19/416; G05B 2219/13095; G05B 2219/43117; H02P 21/0003; H02P 2205/05; H02P 6/08
USPC .............. 318/568.1, 568.13, 568.17, 568.22, 318/568.23, 590, 632, 635
See application file for complete search history.

(56) References Cited

U.S. PATENT DOCUMENTS

| | | | | |
|---|---|---|---|---|
| 4,908,559 A | * | 3/1990 | Kurakake | B25J 9/1607 318/567 |
| 5,216,342 A | * | 6/1993 | Torii | G05B 19/19 318/568.1 |
| 5,378,968 A | * | 1/1995 | Ezawa | B25J 9/1602 318/568.1 |
| 5,384,525 A | * | 1/1995 | Kato | G05B 13/0255 318/568.1 |

(Continued)

FOREIGN PATENT DOCUMENTS

| | | |
|---|---|---|
| JP | H06-319284 A | 11/1994 |
| JP | 2004-74349 A | 3/2004 |

OTHER PUBLICATIONS

Apr. 13, 2018 Search Report issued in European Patent Application No. 17200246.1.

*Primary Examiner* — Bentsu Ro
*Assistant Examiner* — Thai Dinh
(74) *Attorney, Agent, or Firm* — Oliff PLC

(57) ABSTRACT

A machine tool comprises: a servomotor feeding a workpiece or a tool; a motor control section controlling the servomotor; and a processor connected to the motor control section, in a parameter adjustment mode while rotating a load by the servomotor with a given speed command issued to the motor control section under a condition where torque is limited, the processor calculating load inertia based on the torque and an angular acceleration of the servomotor that is obtained based on an output from the servomotor, calculating a parameter based on the load inertia, and adjusting a control parameter set to the motor control section based on the parameter.

6 Claims, 4 Drawing Sheets

(56) References Cited

U.S. PATENT DOCUMENTS

| | | | |
|---|---|---|---|
| 5,475,291 A | 12/1995 | Yoshida et al. | |
| 6,198,246 B1 * | 3/2001 | Yutkowitz | G05B 11/42 318/561 |
| 6,870,345 B1 * | 3/2005 | Wand | G05B 11/42 318/560 |
| 2013/0257339 A1 | 10/2013 | Kim | |

* cited by examiner

MACHINE TOOL AND PARAMETER ADJUSTMENT METHOD THEREFOR

Japanese Patent Application No. 2016-219696 filed on Nov. 10, 2016, is hereby incorporated by reference in its entirety.

BACKGROUND

The present invention relates to a machine tool and a parameter adjustment method therefor, and particularly relates to a parameter adjustment system of a control system for a servomotor enabling adjustment in accordance with a load state of a drive section.

Machine tools, such as a lathe, use a servomotor for a drive system. The servomotor for a spindle or the like with a workpiece chucked is controlled to rotate.

Such a servomotor may be controlled with a method employing a closed-loop position control system, a closed-loop speed control system, and the like. The closed-loop position control system issues a drive command to the servomotor, in such a manner as to achieve an extremely small difference between a rotational position command issued from a controller, a driver, or the like and rotational position information detected by the servomotor. The closed-loop speed control system issues a drive command to the servomotor in such a manner as to achieve an extremely small difference between rotation speed information obtained by differentiating the rotational position information and a rotational speed command issued from the controller, the driver, or the like.

In the control systems, control system parameters, such as a parameter for gain adjustment, need to be adjusted in accordance with a load state.

The adjustment of various parameters requires expert knowledge and skills. Insufficient adjustment of the parameters results in vibrations, chattering on a machined surface of a workpiece, or the like.

A method for easily adjusting a parameter of the servomotor has been called for, especially for machine tools, such as a lathe, requiring a chuck for a spindle to be exchanged in accordance with the shape, the size, and the like of a workpiece, resulting in a large change in load-side inertia.

JP-A-H6-319284 discloses an apparatus and a method for adjusting a control parameter of a servomotor. Unfortunately, the invention according to this patent document, which is directed to achieving the adjustment with a single control parameter, is insufficient for a large change in load-side inertia.

SUMMARY

An object of the present invention is to provide a machine tool enabling easy parameter adjustment for a servomotor, provided in a machine tool, in accordance with load-side inertia (hereinafter, referred to as load inertia) driven by the servomotor and to provide a method for the parameter adjustment.

One aspect of the present invention relates to a machine tool comprising:
a servomotor feeding a workpiece or a tool;
a motor control section controlling the servomotor; and
a processor connected to the motor control section,
in a parameter adjustment mode while rotating a load by the servomotor with a given speed command issued to the motor control section under a condition where torque is limited, the processor calculating load inertia based on the torque and an angular acceleration of the servomotor that is obtained based on an output from the servomotor, calculating a parameter based on the load inertia, and adjusting a control parameter set to the motor control section based on the parameter.

Another aspect of the present invention relates to a parameter adjustment method for adjusting a control parameter of a motor control section controlling a servomotor used in a drive system for a machine tool, the method comprising:
in a parameter adjustment mode while rotating a load by the servomotor with a given speed command to the motor control section under a condition where torque is limited, calculating load inertia based on the torque and an angular acceleration of the servomotor that is obtained based on an output from the servomotor,
calculating a parameter based on the load inertia; and
adjusting the control parameter of the motor control section based on the parameter The servomotor according to the present invention is a motor including a servo mechanism, and is not limited to any particular application.

An example of the servomotor includes a spindle motor for a machine tool or the like. A load driven by the servomotor in a parameter adjustment mode is any parts driven by the servomotor. For example, a load driven by a spindle motor includes a spindle driven by a spindle motor, a chuck mounted to the spindle, and a workpiece held by the chuck.

The processor according to the present invention preferably compares a calculated servo parameter with a basic parameter in a state with a reference load.

The state with a reference load is a state with reference load-side inertia, and is a state where no chuck or workpiece is attached to the spindle, a state where only a standard chuck is attached to the spindle, or the like in an example of a lathe. A parameter set in the state with a reference load is referred to as a basic parameter, which may be acquired in advance through calculation or manual adjustment according to the present invention.

For example, a ratio between the two values described above=(servo parameter/basic parameter) may be used for an adjustment method using the servo parameter calculated on the basis of an actual load (a spindle, a chuck and a workpiece) attached to the machine tool.

A parameter of the servomotor according to the present invention can be adjusted in the machine tool without using a complex measurement device, based on actual load-side inertia, and thus can be adjusted by a user of the machine tool or automatically adjusted in the machine.

DESCRIPTION OF EXEMPLARY EMBODIMENTS

Figure 1:
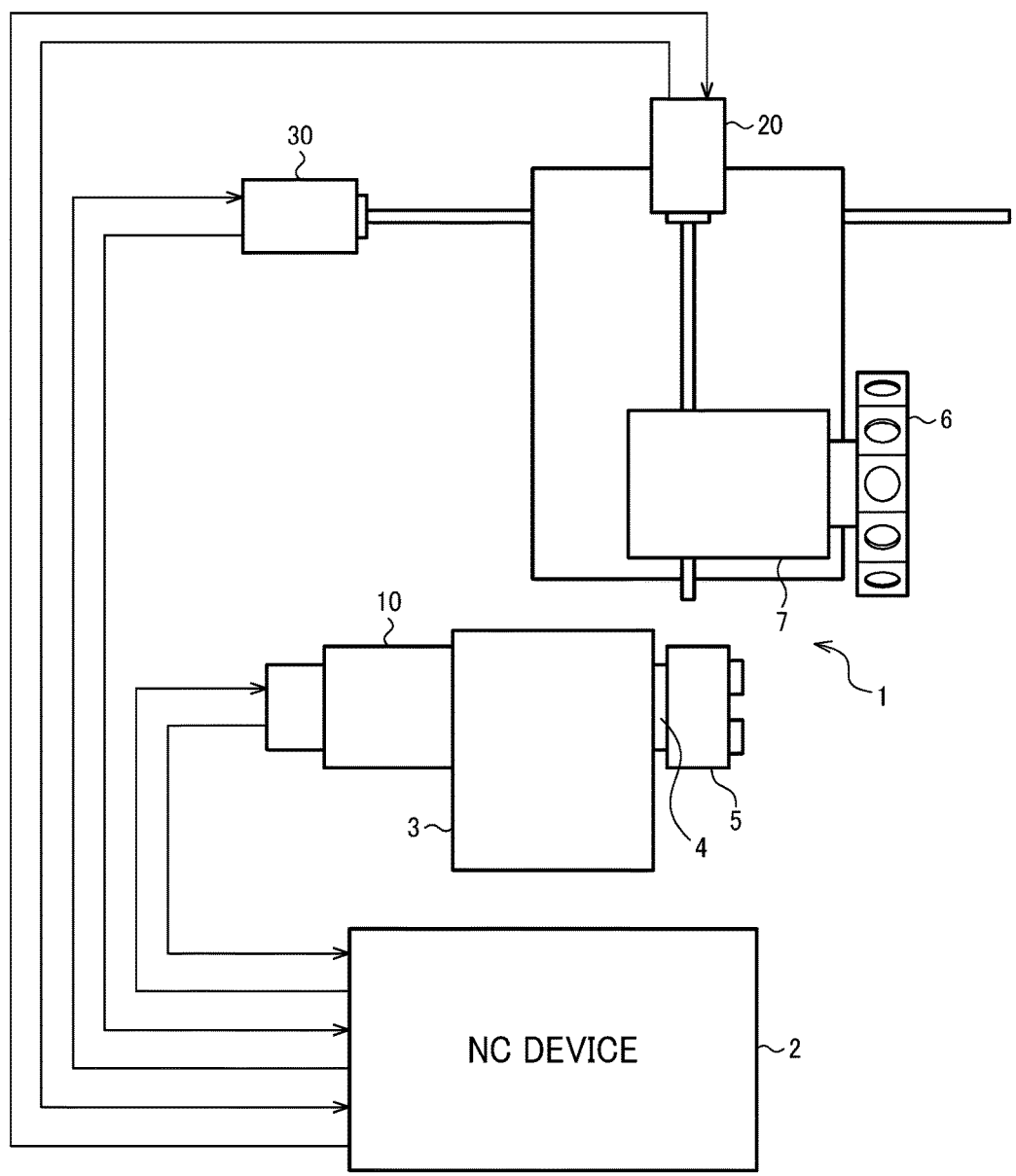
FIG. 1 is a schematic view of a machine tool.

FIG. 1 illustrates a lathe that is a machine tool according to one embodiment of the present invention. The lathe 1 includes a numerical control (NC) device 2. A spindle chuck 5 is detachably attached to a spindle 4 supported by a headstock 3. The chuck 5 holds a workpiece (not illustrated). A spindle motor 10 feeds the workpiece in a rotating manner. The spindle 4, the chuck 5, and the workpiece are loads drivingly rotated by the spindle motor 10. A tool turret 6 is attached to a tool rest 7. Motors 20 and 30 drivingly feed the tool rest 7 in directions of two orthogonal axes. The motor 20 drivingly feeds the tool in a direction orthogonal to the spindle. The motor 30 drivingly feed the tool in a direction along the spindle. The spindle motor 10 and the tool feeding motors 20 and 30 are each a servomotor connected to the NC device 2.

Figure 2:
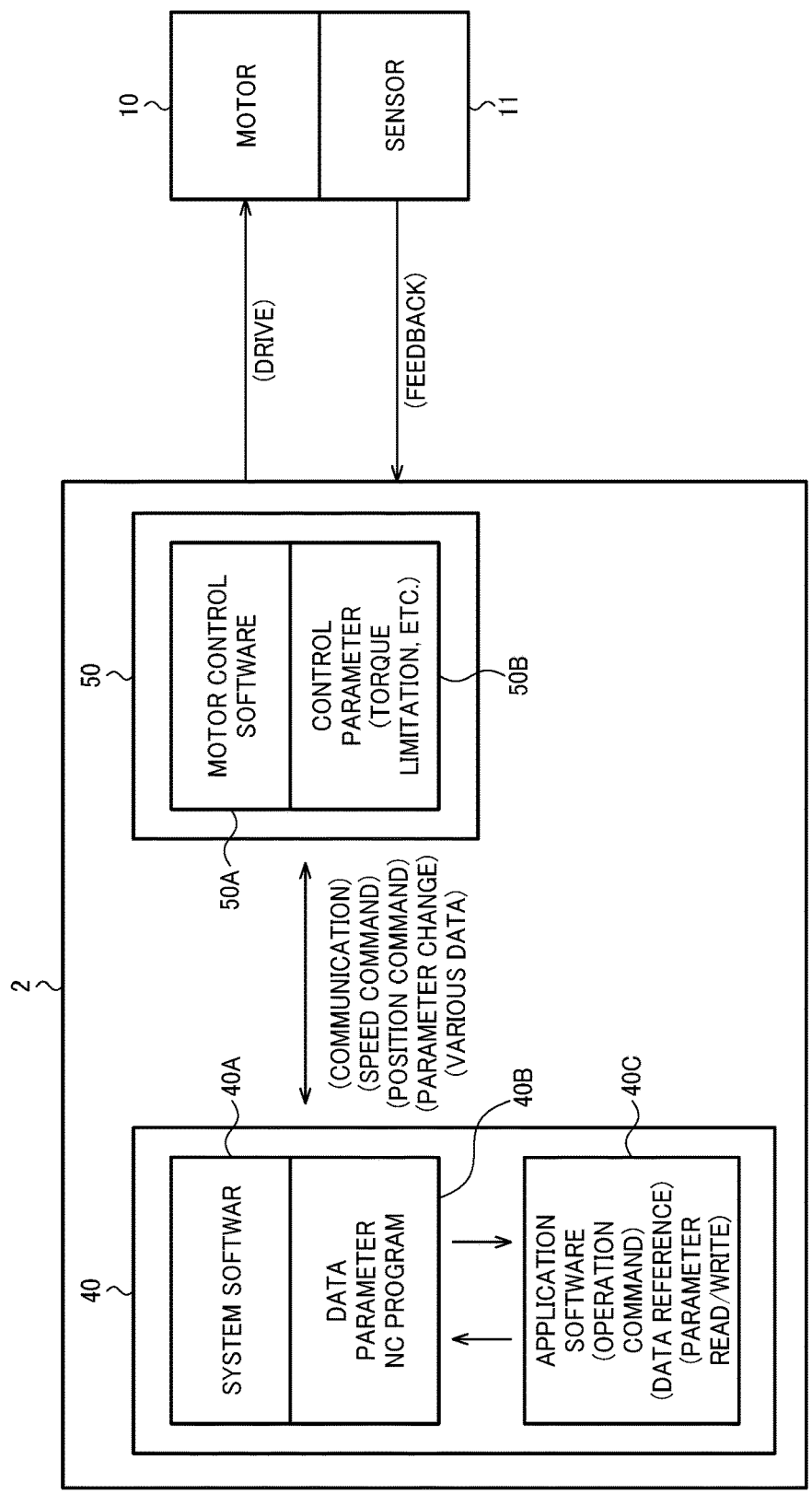
FIG. 2 is a schematic block diagram illustrating a control system for a servomotor.

As illustrated in FIG. 2, the NC device 2 include a processor (main control device) 40 and a motor control section 50. The NC device 2 is described based on an example of adjusting a parameter for driving the spindle motor 10. The parameter may be similarly adjusted for the tool feeding motors 20 and 30. For example, the processor 40 uses hardware, such as a central processing unit (CPU) and a memory, and software (such as a program, data, and a parameter) stored in the memory to control the motor control section 50. Specifically, the processor 40 may include: a storage section 40A that stores system software; a storage section 40B that stores data, a parameter, an NC program, and the like; a storage section 40C that stores an application program that performs operations such as operation command, data reference, parameter read/write, and the like; and the CPU (not illustrated). The motor control section 50 may include: a storage section 50A that stores motor control software; a storage section 50B that stores a control parameter for limiting torque or for other like operations; and a current control means (amplifier) (not illustrated) that controls current flowing in the spindle motor 10. The spindle motor 10 includes an internal or external sensor 11 such as an encoder, and feeds back position information or speed information.

The spindle motor 10 is driven with the processor 40 transferring a parameter to the motor control section 50, and the motor control software in the motor control section 50 controlling the current flowing in the spindle motor 10 based on the parameter.

Figure 3:
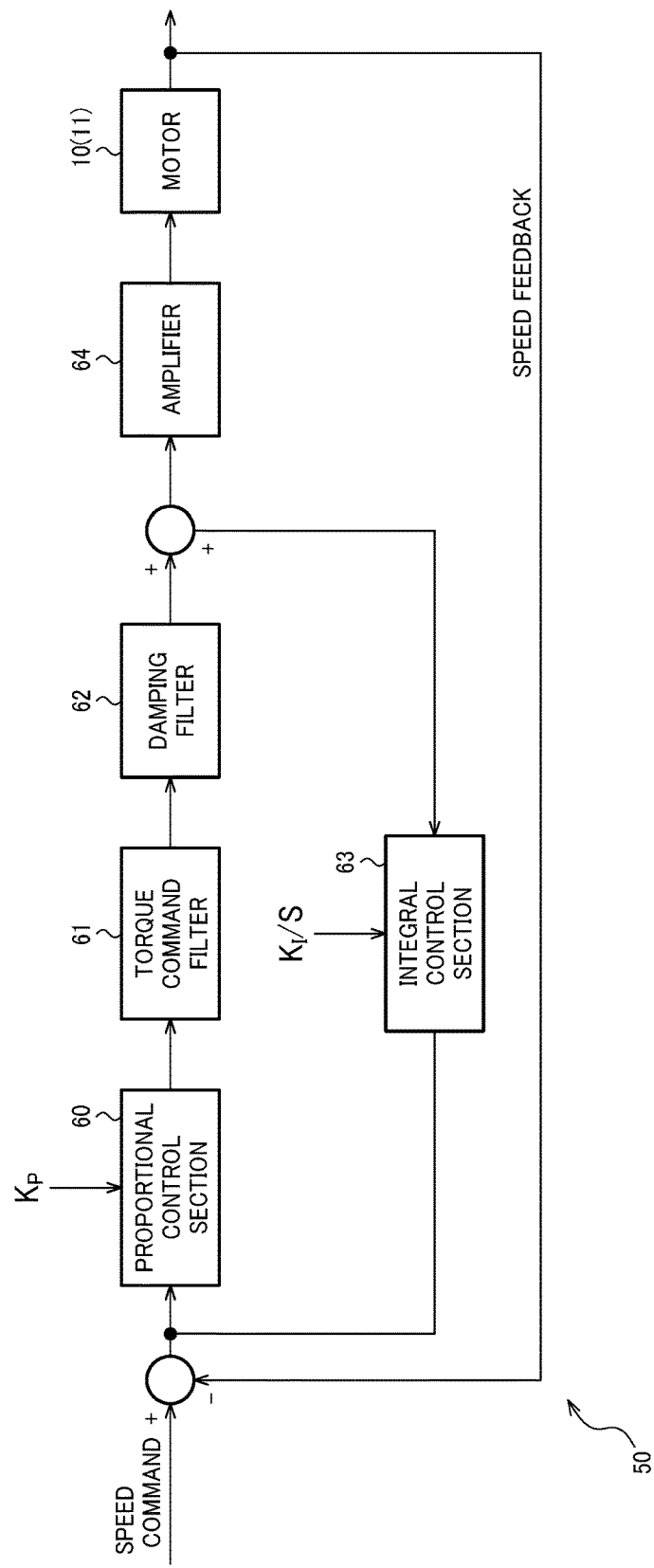
FIG. 3 is a functional block diagram illustrating a drive control system for the servomotor.

FIG. 3 is a functional block diagram illustrating various functions implemented by software or the like of the motor control section 50. FIG. 3 illustrates an example of Proportional Integral (PI) control. However, the present invention is not limited to this, and may be applied to any one of Integral (I) control, Proportional (P) control, and Derivative (D) control, or a combination of more than one of these.

In FIG. 3, a proportional control section 60 performs P control on a difference (target value−current value) between a command value that has been input and a speed feedback value from the motor 10, based on a transfer function $K_P$ ($K_P$ is a proportional gain). A torque command filter 61, which is a lowpass filter, cuts off the high frequency component of the torque command. A damping filter 62 constantly monitors a change in a vibration frequency in a torque command, and recalculates a parameter of the damping filter 62 to change the characteristics of the filter in accordance with a change in frequency.

The difference (target value−current value) is also input to an integral control section 63. The integral control section 63 performs I control on the difference based on a transfer function $K_1/S$ ($K_1$ is an integral gain, S is a Laplacian operator).

An amplifier 64, which is an example of the current control means, controls current flowing in the spindle motor 10 based on the difference (target value−current value) that has been PI controlled according to the transfer function $(K_P+K_1/S)$.

Figure 4:
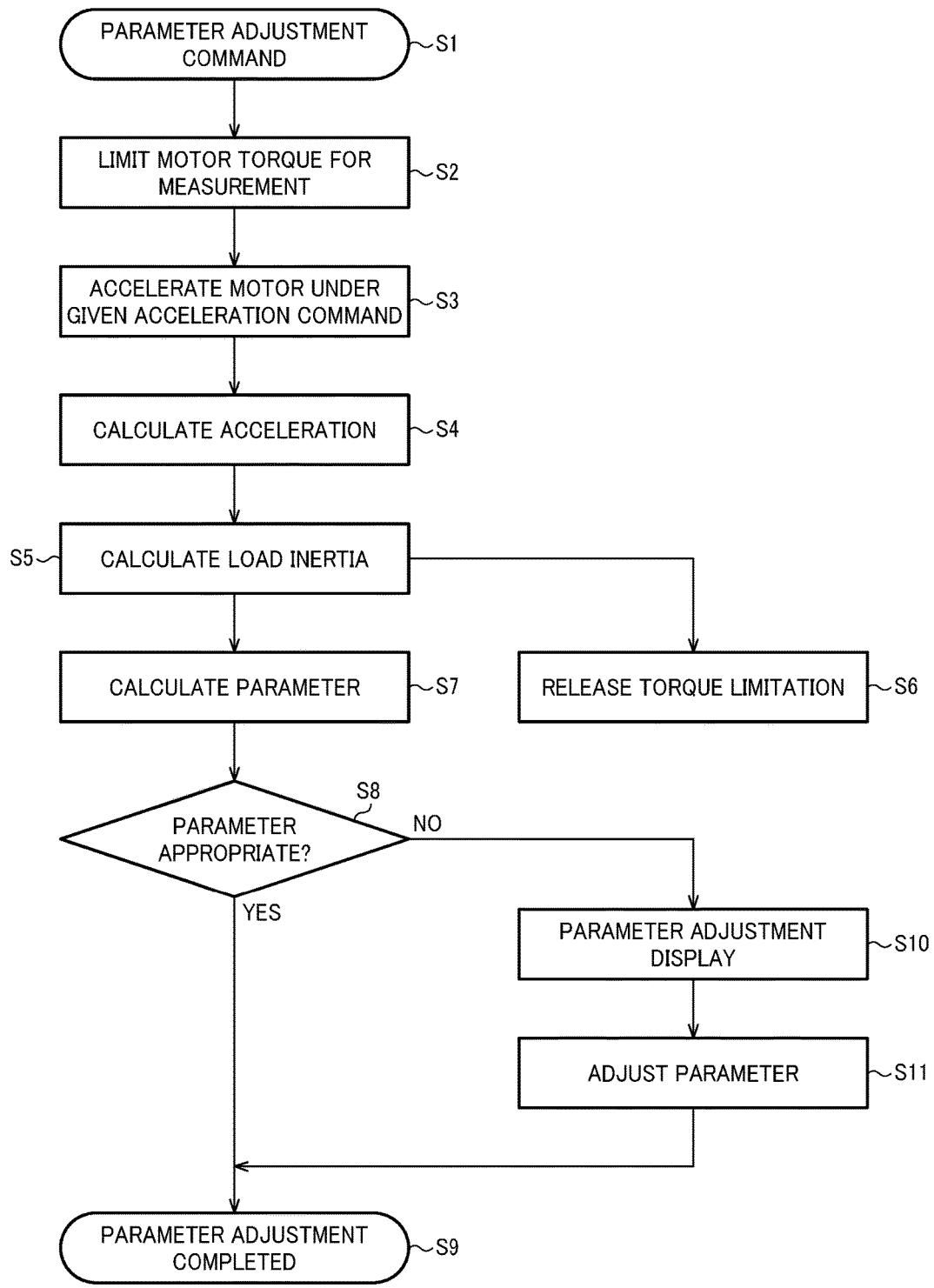
FIG. 4 is a flowchart illustrating an example of a parameter adjustment system according to the present invention.

FIG. 4 is a flowchart illustrating an example of an operation, for adjusting a parameter of the servomotor 10, performed by the processor 40 according to the present embodiment.

Upon exchanging a spindle chuck or the like of a lathe, a multifunction machine, or the like, an operator presses a parameter adjustment command button on a control panel or the like (step $S_1$).

Thus, the machine transitions to a parameter adjustment mode, in which a motor torque control means (the amplifier 64 in FIG. 3 for example) limits the motor torque so that the torque is prevented from exceeding a certain value (step $S_2$). With the torque thus limited, the processor 40 outputs a given speed command to the motor control section 50.

Thus, rotation of the motor 10 is accelerated under the loads such as the chuck and the workpiece newly installed (step $S_3$). An acceleration calculation means (software) of the processor 40 calculates angular acceleration (rad/s$^2$) based on rotation information (position or rotation speed) from the sensor 11 of the motor 10 (step $S_4$). Instead of the processor 40, an acceleration calculation means (software) of the motor control section 50 may calculate angular acceleration. In any case, the processor 40 is able to acquire the angular acceleration based on the output of the servomotor 10.

A rotation inertia calculation means (software) of the processor 40 calculates load-side rotation inertia (also referred to as angular moment) $I_1$ (kg·m·s$^2$) based on $I_1=\tau/\omega$, where $\tau$ (kg·m) represents the torque limited and $\omega$ represents angular acceleration calculated (step $S_5$).

The processor 40 further releases the torque limitation by the motor torque limitation means (amplifier 64) of the motor control section 50 (step $S_6$).

The storage means 40B of the processor 40 stores therein in advance, servomotor-side rotation inertia and load-side reference inertia $I_0$ in a state where the chuck 5 or the workpiece is not attached to the spindle 4.

The reference inertia $I_0$ may also be a value obtained in a state where the reference chuck is attached or in other like states.

Based on these pieces of information, a gain (servo gain parameter) $P_1$ (the gain $P_1$ according to the present embodiment is a proportional gain $K_P$ or an integral gain $K_1$) of a speed loop is obtained with the following Formula (1):

$$P_1 = P_0 \times (1 + C \times I_1/I_0) \quad (1)$$

where $P_0$ denotes a servo gain basic parameter in the state with a reference load (reference inertia), $I_0$ denotes the reference inertia, $I_1$ denotes load inertia at the time of measurement, C denotes a correction coefficient including at least one of coefficients M, S, and X (C=(M+S+X) for example), M denotes a coefficient depending on a motor, S denotes a coefficient depending on a spindle diameter, and X denotes a coefficient related to other mechanical systems.

When a servo gain basic parameter $P_0$ is set as a gain of a control section in the speed loop, the gain $P_1$ is obtained with Formula (1). In the parameter adjustment mode according to the embodiment illustrated in FIG. 3, a proportional gain basic parameter $K_{P0}$ is set to the proportional control section 60 and an integral gain basic parameter $K_{I0}$ is set to the integral control section 63.

Whether or not the parameter is appropriate is determined by using a value of the ratio $P_1/P_0$ between the servo gain parameter $P_1$ and the servo gain basic parameter $P_0$ thus calculated by the parameter calculation means (software) of the processor 40 (step $S_8$).

When the value is within a predetermined range of values, the parameter adjustment is completed (step $S_9$), and the processing by the device goes on.

When the value of the $P_1/P_0$ is higher or lower than the upper or the lower limit input in advance, a parameter adjustment display is output (step $S_{10}$).

In this case, the operator may adjust the parameter based on the parameter adjustment display (step $S_{11}$). Alternatively, an adjustment program may be installed in the processor 40 in advance so that auto adjustment can be performed.

Based on Formula (1), the proportional gain $K_P$ and the integral gain $K_I$ are obtained from the following Formulae (2) and (3):

$$K_P = K_{P0} \times (1 + C \times I_1/I_0) \qquad (2)$$

$$K_I = K_{I0} \times (1 + C \times I_1/I_0) \qquad (3)$$

where $K_{P0}$ denotes a proportional gain basic parameter in the state with a reference load (reference inertia) and $K_{I0}$ denotes an integral gain basic parameter in the state with a reference load (reference inertia).

The proportional gain basic parameter $K_{P0}$ and the integral gain basic parameter $K_{I0}$ are gains set to the proportional control section 60 and the integral control section 63 in the speed loop when the reference inertia in the state with a reference load is calculated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A machine tool comprising:
   a servomotor feeding a workpiece or a tool;
   a motor control section controlling the servomotor; and
   a processor connected to the motor control section,
   in a parameter adjustment mode while rotating a load by the servomotor with a given speed command issued to the motor control section under a condition where torque is limited, the processor calculating load inertia based on the torque and an angular acceleration of the servomotor that is obtained based on an output from the servomotor, calculating a parameter based on the load inertia, and adjusting a control parameter set to the motor control section based on the parameter.

2. The machine tool as defined in claim 1, the processor adjusting the control parameter of the motor control section based on a value as a result of comparison between a basic parameter in a state with a reference load different from the load and the calculated parameter.

3. The machine tool as defined in claim 2, the processor calculating a parameter $P_1$ based on $P_1 = P_0 \times (1 + C \times I_1/I_0)$, where $I_0$ denotes reference inertia in the state with the reference load, $P_0$ denotes the basic parameter corresponding to the reference inertia $I_0$, $I_1$ denotes the load inertia, $P_1$ denotes the parameter corresponding to the load inertia $I_1$, and C denotes a correction coefficient.

4. The machine tool as defined in claim 3,
   the motor control section including a proportional control section in a speed loop,
   the processor setting a proportional gain basic parameter $K_{P0}$ corresponding to the reference inertia to the proportional control section in the parameter adjustment mode and calculating a proportional gain $K_P$ based on $K_P = K_{P0} \times (1 + C \times I_1/I_0)$.

5. The machine tool as defined in claim 3,
   the motor control section including an integral control section in a speed loop,
   the processor setting an integral gain basic parameter $K_{I0}$ corresponding to the reference inertia to the integral control section in the parameter adjustment mode and calculating an integral gain $K_1$ based on $K_1 = K_{I0} \times (1 + C \times I_1/I_0)$.

6. A parameter adjustment method for adjusting a control parameter of a motor control section controlling a servomotor used in a drive system for a machine tool, the method comprising:
   in a parameter adjustment mode while rotating a load by the servomotor with a given speed command to the motor control section under a condition where torque is limited, calculating load inertia based on the torque and an angular acceleration of the servomotor that is obtained based on an output from the servomotor,
   calculating a parameter based on the load inertia; and
   adjusting the control parameter of the motor control section based on the parameter.

\* \* \* \* \*